(12) United States Patent
Diederich

(10) Patent No.: US 10,234,082 B1
(45) Date of Patent: Mar. 19, 2019

(54) IR-VIS-FLASHLIGHT

(71) Applicant: Rainer Diederich, Reichshof-Denklingen (DE)

(72) Inventor: Rainer Diederich, Reichshof-Denklingen (DE)

( * ) Notice: Subject to any disclaimer, the term of this patent is extended or adjusted under 35 U.S.C. 154(b) by 0 days.

(21) Appl. No.: 15/707,099

(22) Filed: Sep. 18, 2017

(51) Int. Cl.
| | |
|---|---|
| *F21L 4/02* | (2006.01) |
| *F21L 14/02* | (2006.01) |
| *F21V 23/04* | (2006.01) |
| *H05B 37/02* | (2006.01) |
| *F21Y 113/20* | (2016.01) |

(52) U.S. Cl.
CPC .................. *F21L 4/02* (2013.01); *F21L 14/02* (2013.01); *F21V 23/0414* (2013.01); *H05B 37/02* (2013.01); *F21Y 2113/20* (2016.08); *G02F 2203/11* (2013.01)

(58) Field of Classification Search
CPC ......... F21L 4/02; F21L 14/02; F21V 23/0414; F21Y 2113/20; H05B 37/02; G02F 2203/11
USPC .......................................................... 362/12
See application file for complete search history.

(56) References Cited

U.S. PATENT DOCUMENTS

| | | | | |
|---|---|---|---|---|
| 4,876,632 A | * | 10/1989 | Osterhout | G01R 15/04 320/DIG. 21 |
| 6,623,139 B1 | | 9/2003 | Gutmann | |
| 7,534,975 B1 | * | 5/2009 | Sharrah | F21L 4/027 200/336 |
| 9,810,413 B2 | * | 11/2017 | Buhl | F21L 4/005 |
| 9,874,337 B2 | * | 1/2018 | Galli | F21V 21/0885 |
| 9,958,143 B2 | * | 5/2018 | Galli | F21V 21/0885 |
| 2002/0108966 A1 | * | 8/2002 | Park | F41H 9/10 222/113 |
| 2005/0122710 A1 | | 6/2005 | Kim | |
| 2005/0122712 A1 | * | 6/2005 | Kim | F21L 4/027 362/184 |
| 2007/0258236 A1 | | 11/2007 | Miller | |

(Continued)

FOREIGN PATENT DOCUMENTS

| | | |
|---|---|---|
| DE | 10-2012-024773 A1 | 6/2014 |
| DE | 102015225101 A1 | 6/2017 |
| EP | 3181989 A1 | 6/2017 |

OTHER PUBLICATIONS

Definition of "unhindered", Merriam-Webster Online Dictionary, retrieved from https://www.merriam-webster.com/dictionary/unhindered on Jun. 13, 2018.*

*Primary Examiner* — Claude J Brown
(74) *Attorney, Agent, or Firm* — Morgan Lewis & Bockius LLP

(57) ABSTRACT

A flashlight includes a casing having a casing interior and a casing outer side, an infrared light source arranged in the casing interior for operation in at least one infrared light mode, a visible light source arranged in the casing interior for operation in at least one visible light mode, an energy source, a control unit for driving the infrared light source and the visible light source, and a manually operable operating element, arranged on the casing outer side, for selecting between the at least one infrared light mode, the at least one visible light mode and a switch-off mode. The flashlight further comprises a locking element for blocking the operating element during a transition from the at least one infrared light mode to the at least one visible light mode.

14 Claims, 7 Drawing Sheets

(56) References Cited

U.S. PATENT DOCUMENTS

Figure 1:
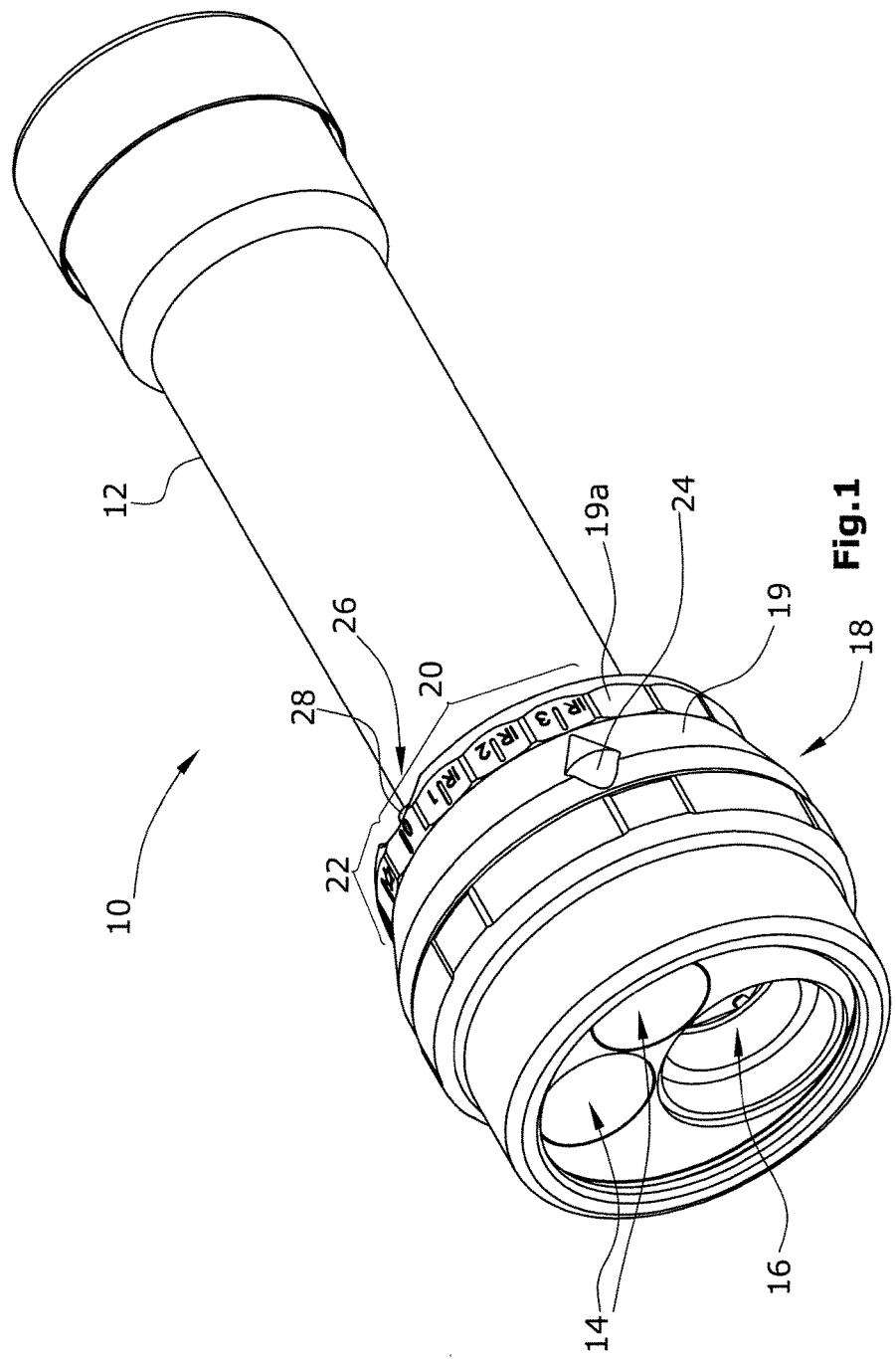

| | | | |
|---|---|---|---|
| 2009/0189548 A1 | 7/2009 | Hoffman et al. | |
| 2010/0091485 A1 | 4/2010 | Matthews et al. | |
| 2010/0277295 A1* | 11/2010 | Matthews | F21L 4/005 340/332 |
| 2011/0140845 A1* | 6/2011 | Sanders | G08B 15/004 340/6.1 |
| 2012/0069165 A1* | 3/2012 | Choi | H04N 1/00413 348/61 |
| 2012/0139452 A1* | 6/2012 | Galli | F41G 11/004 315/313 |
| 2012/0268920 A1* | 10/2012 | Matthews | F21V 23/0414 362/110 |
| 2015/0155728 A1 | 6/2015 | Feustel et al. | |
| 2016/0348880 A1* | 12/2016 | Galli | F21V 21/0885 |

* cited by examiner

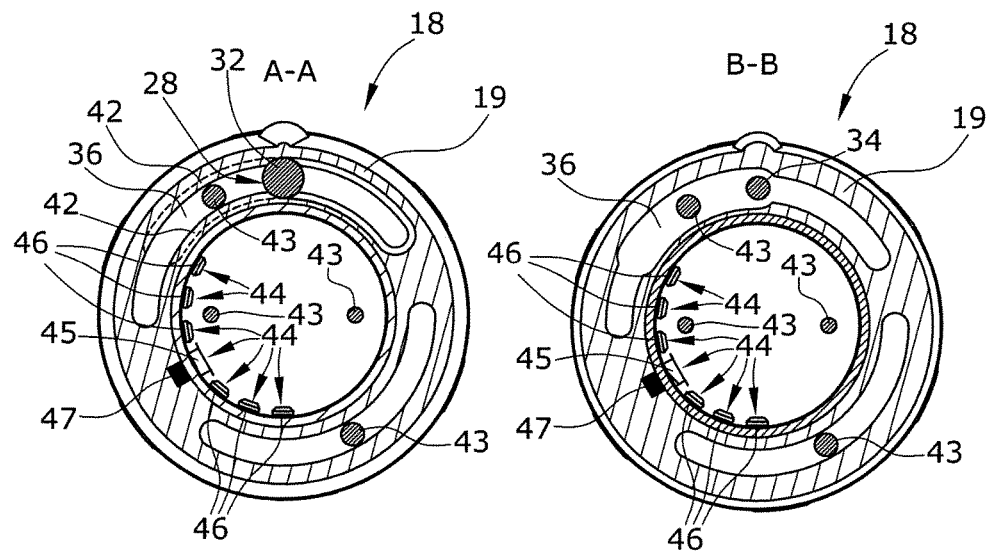
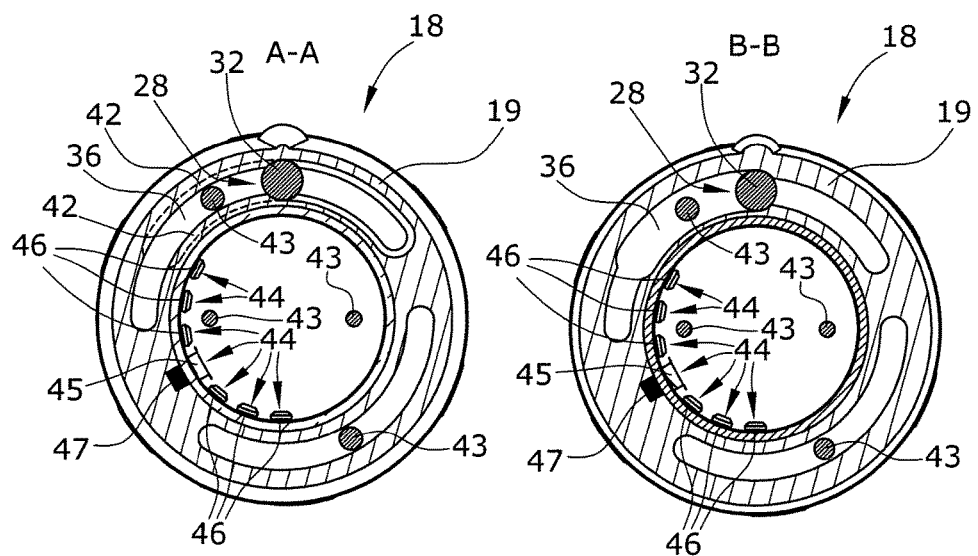

IR-VIS-FLASHLIGHT

The invention relates to a flashlight of the infrared light/visible light type (IR-VIS flashlight).

Flashlights are generally known in a large variety. Most flashlights comprise visible light sources for illuminating diverse objects at darkness and thus making them visible. Particularly, frequent use is made of white light sources, i.e. light sources having a wide emission spectrum.

Further, flashlights with infrared light sources are generally known. These are normally used, in different fields of application, in combination with night-vision devices. Infrared-light flashlights are used e.g. in hunting and when observing animals at night. In this manner, for instance, the hunter will remain unnoticed and the animals in the wood will not be chased away by him or by glaring light.

On the market, a few flashlights are available that comprise both visible light sources and infrared light sources.

In these flashlights, it can normally be set, via an operating element, which one of the two light sources is to be switched on. In this respect, it is often provided that the operating element comprises a switch-off position and that, on one side of said switch-off position, a setting range for the infrared light source is arranged while, on the other side of said switch-off position, a setting range for the visible light source is arranged.

Particularly, in US 2010/0091485 A1, there is described a flashlight comprising a visible light source and an infrared light source. In this flashlight, a change between the infrared light mode and the visible light mode can be made by actuating an operating element.

Further, U.S. Pat. No. 6,623,139 B1 discloses a flashlight comprising a visible light source and an infrared light source. Via an operating element configured in the form of a rotating sleeve, the flashlight can be put to use in the infrared light mode and the visible light mode.

Also in US 2015/0155728 A1, a flashlight comprising an infrared light source and a visible light source is described. Further flashlights are known from US 2007/0258236 A1 and US 2005/0122710 A1.

None of the known flashlights comprises a locking element by which the transition from the infrared light mode to the visible light mode is locked whereas the transition from the visible light mode to the infrared light mode is performed unhindered.

If a flashlight is operated in the infrared light mode and shall be switched off after use, it may happen that the operating element undesirably migrates into the setting range for the visible light source. Thereby, the visible light source is unintentionally switched on and the hunter (or animal watcher) is undesirably spotted. This may unavoidably lead to an unpleasant and often even dangerous situation, particularly if the hunter (or animal watcher) is in the immediate vicinity of a dangerous animal and is perceived by it due to the switched-on visible light source.

Thus, it is an object of the invention to provide an IR-VIS flashlight wherein an undesired switch-on of the visible light source is prevented.

To achieve the above object, there is provided a flashlight comprising
- a casing having a casing interior and a casing outer side,
- an infrared light source arranged in the casing interior for operation in at least one infrared light mode,
- a visible light source arranged in the casing interior for operation in at least one visible light mode,
- an energy source,
- a control unit for driving the infrared light source and the visible light source, and
- a manually operable operating element, arranged on the casing outer side, for selecting between the at least one infrared light mode, the at least one visible light mode and a switch-off mode.
- wherein the operating element is movable into different adjustment positions along an adjustment path comprising a first adjustment range and a second adjustment range, wherein, in said first range, the at least one infrared light mode or the switch-off mode is selectable and, in said second range, the at least one visible light mode is selectable,
- a locking element for locking the operating element upon its movement from said first range to said second range, wherein the locking state of the operating element upon its movement from said first range to said second range can be released by actuation of the locking element in the switched-off mode adjustment position, and
- wherein a transition of the operating element from said second range to said first range is performed in an unhindered manner.

A particular advantage of the flashlight of the invention resides in that, during the transition from the infrared light mode to the visible light mode, the operating element is blocked. Thereby, it is prevented that the user of the flashlight might erroneously switch on the visible light. This can be relevance particularly in the above described situations when the user of the flashlights wishes to remain unseen. Switch-on of the visible light source is possible only when the user intentionally unlocks the operating element. On the other hand, no locking is provided in case of switching from the visible light mode to the infrared light mode because an erroneous switch-on of the infrared light source (whose light would be perceived only by persons using a night-vision device) does not cause a dangerous situation.

For the locking element, various constructional embodiments are possible. Particularly, the locking element can be designed as a locking pin arranged for movement within a guide groove. For instance, the locking pin can have two different diameters along its longitudinal axis and the guide groove can have two different groove diameters to the effect that the guide pin is movable only in specific portions of the guide groove and, during the movement of the operating element from the first adjustment range in the direction of the second adjustment range, will impinge onto an abutment face, thus blocking the transfer into the second adjustment range. In this blocked position, it can then be provided that the locking pin is unlockable.

Further, the guide groove can be L-shaped so that the locking pin during the movement from the infrared adjustment range into the switch-off position will impinge onto a stopper so that, in the switch-off position, the locking pin has to be deflected in order to enter the adjustment range for the visible light. In this regard, further embodiments of the locking pin are explicitly not excluded.

In the flashlight of the invention, the flashlight casing serves for safely housing the individual flashlight components and for protection from dust, dirt, moisture and impacts. The casing can preferably be made from plastic or metal and preferably can be rod-shaped. One side of the flashlight casing is provided with an opening through which the generated light can exit.

The infrared light source can preferably be an infrared LED (light-emitting diode). It can also be provided that the infrared light source comprises more than one LED. In principle, apart from LEDs, also all other light sources can be used that are suited for generating infrared light. Particularly, the infrared light source be provided in the form of one or a plurality of LEDs having an emission wavelength of 840 mm, 850 mm, 880 mm, 890 mm, 940 mm or 950 mm.

Also in the visible light source, there can preferably be provided an LED or also a plurality of LEDs. In the visible light source, particularly a white light LED can be provided. Alternatively, use can be made of a red, green or blue LED. Further, a combination of different LEDs can be used.

As an energy source, particularly a battery or an accumulator can be provided. Particularly, a lead accumulator can be provided. Use of a lead accumulator is advantageous particularly because of its reliable operation also in very low temperatures.

As a control unit, particularly an electronic circuit or a microcontroller can be used. By means of the control unit, particularly the brightness of the at least two light source can be controlled. For this purpose, use can be made particularly of a PWM control (PWM: pulse width modulation). For instance, it can be provided that the control unit will set the brightness of the individual light sources continuously or discretely. Further, it can be provided that the control unit will drive the light sources by a coded signal. Thus, the flashlight of the invention is not only suited to illuminate objects in darkness but is also suited for communication with another person by means of coded signals.

The operating element can have any design and can particularly be realized in the form of a sliding element or rotary element.

Further, it can be provided that the flashlight comprises a focusing optics, a collimation optics or a protective glass cover. In this connection, it can be particularly provided that the flashlight comprises an infrared filter as described in DE 10 2012 024 773 A1.

According to one embodiment of the flashlight of the invention, it can be provided that the operating element is designed as a rotatable adjustment ring. In this case, the adjustment ring can be arranged particularly in the front region, i.e. in the foremost third or in the foremost quarter of the flashlight. The rotatable adjustment ring can be movable in a first adjustment range and a second adjustment range. In the first adjustment range, a selection can be made e.g. among three infrared modes and a switch-off mode. In the second adjustment range, a selection can be made e.g. among three different visible light modes. For instance, the three infrared light modes can comprise two infrared light modes with different brightness levels and one infrared light mode with a coded signal. The coded signal can comprise particularly a blinking, stroboscope, emergency or warning signal. In analogy to the above, it can be provided that the visible light modes comprises two visible light modes with different brightness levels and one visible light mode with a coded signal. As a further feature of the flashlight of the invention, it can be provided that the current adjustment position of the operating element is detectable by at least one magnetic sensor. In this case, there can be provided particularly Hall sensors, reed switches and magnetic proximity switches. Particularly, it can be provided in this respect that, for each adjustment position of the operating element, a respective magnetic sensor is provided. According to one embodiment, it can be provided that the movable operating element comprises a permanent magnet and that, in the immediate vicinity of said permanent magnet, individual magnetic sensors are arranged on the flashlight casing, wherein, for each adjustment position of the operating element, a respective magnetic sensor is provided. By the movement of the operating element and the permanent magnet, a magnetic sensor will be activated in accordance with the adjustment position of the operating element. Further, it can be provided that, in the switch-off position of the operating element, a reed contact is provided and, for all other adjustment positions, Hall sensors are provided.

According to a further embodiment of the flashlight of the invention, it can be provided that the magnetic sensor is designed as a Hall sensor. In this regard, it can be provided that all sensors which are arranged on the flashlight casing are realized as Hall sensors and that the operating element comprises a permanent magnet which is movable along the individual Hall sensors. Thereby, in accordance with the adjusting position of the operating element, one of the Hall sensors will be activated.

Further, according to an embodiment of the flashlight of the invention, it can be provided with preference that the control unit is designed as a microcontroller. A considerable advantage of the use of microcontrollers resides in that these are commercially available articles and are inexpensive. Further, microcontrollers are available in a large variety of embodiments and allow for simple programming and for flexible driving options for the light sources.

According to a further embodiment of the invention, it can be provided that the control unit is designed to generate a pulse width modulation signal, a blinking signal, an SOS signal or a stroboscope signal. In this regard, the pulse width modulation signal can serve for dimming the light source. The coded signals which e.g. represent an SOS signal can serve allow different persons to communicate with each other in darkness without generating visible light. For instance, several hunters can communicate with each other in a forest at darkness while the deer in the forest cannot perceive a light signal. Particularly, an SOS signal can be generated when a hunter or animal observer happens to get into an emergency situation. In such a case, this signal will be perceived only by those persons who likewise have a night-vision device. There can be provided also further coded signals tailored to other imaginable situations.

According to a further embodiment of the invention, it can be provided that the casing comprises at least one heat insulation means. The heat insulation means can serve to guarantee the function of the flashlight also in case of extreme temperatures of up to −30° C., −40° C. or −50° C. The heat insulation means is intended to protect particularly the electronics arranged within the casing, and the light sources. For heat insulation, use can be made of commonly available insulation materials such as e.g. plastic, polystyrene or also an air or vacuum gap. The heat insulation means can be arranged particularly in the interior or also on the outer side of the casing or, according to a further embodiment, be defined by the casing material itself.

As a further embodiment of the invention, it can be provided that the flashlight casing comprises at least one sealing element. The sealing will protect particularly the light sources and the electronics which are arranged within the casing. In this regard, there is particularly obtained a protection against water, dust and humidity. The sealing can be achieved e.g. by O-rings, i.e. annular sealing elements.

Preferably, it can be further provided according to an embodiment of the flashlight of the invention that the outer side of the casing comprises an infrared light display device for displaying the current state of the energy source charge level. The purpose of using an infrared light display device resides in that no visible light will be generated by the charge level display of the flashlight. Only the user of the flashlight who employs a night-vision device will be able to see the display. The display can be realized e.g. by one or a plurality of LEDs. In case that a plurality of LEDs are used, it can be provided e.g. that, in dependence on the charge level, there will be lit one LED, two LEDs or three LEDs. In case that only one LED exists for display of the charge level, it can be provided that, in dependence on the charge level of the energy source, this LED will be blinking either slowly or rapidly. Preferably, it is provided that the one charge level display LED or the plurality of charge level display LEDs have the same emission wavelength as the infrared light source. Further, it can be provided that the infrared light display device is arranged on the rear side of the casing, i.e. on the side of the casing opposite to the opening of the casing. According to a further embodiment, it can be provided that the display LED and respectively LEDs will not be illuminated permanently but only when the user will press a key provided for the charge level display. In this manner, unnecessary energy consumption is avoided at times when the charge level display is not needed.

According to a further embodiment, it can be provided that the infrared light display device is arranged in the interior of the casing. In this case, it is further provided that the casing comprises, at least at one side, a transparent area. This transparent area can be realized e.g. as an inspection window. This inspection window can be made of a material having a particularly high transparency in the infrared wavelength range. Particularly, the inspection window can be made of transparent plastic or of glass.

According to a further embodiment of the invention, it can be provided that the outer side of the casing comprises a visible light display device for displaying the current charge level of the energy source when the visible light mode has been selected. The visible light display device can be activated when a visible light mode has been selected. In this regard, it can also be provided that the visible light display device is not activated permanently but will display the charge level of the energy source only when a button or key provided for this purpose is actuated.

As a further embodiment of the invention, it can be provided that the infrared light display device is activated only in the infrared light mode and that the visible light display device is activated only in the visible light mode. In this manner, it is safeguarded that, in the infrared light mode—i.e. when the user of the flashlight employs a night-vision device—no visible light will be generated and, when the visible light mode is activated, no infrared light will be generated.

According to a preferred embodiment of the flashlight of the invention, it can be provided particularly that
  the locking element is designed as a locking pin comprising a cylindrical pin head having a first pin diameter and a cylindrical pin collar having a second pin diameter,
  the second pin diameter being larger than the first pin diameter, and
  the locking pin being resiliently supported along its longitudinal axis,
  the operating element comprises a longitudinal hole including a first longitudinal hole portion within which the adjustment positions of the first adjustment range can be selected, and a second longitudinal hole portion within which the adjustment positions of the second adjustment range can be selected,
  the first longitudinal hole portion having a first longitudinal hole diameter and the second longitudinal hole portion having a second longitudinal hole diameter,
  the first longitudinal hole diameter is larger than the second pin diameter, and the second longitudinal hole diameter is smaller than the second pin diameter and larger than the first pin diameter,
  the operating element comprising, in the first longitudinal hole portion, a support shoulder for supporting the pin collar and for preventing the locking pin from being pressed down in all adjustment positions in the first adjustment range, except for the switch-off mode adjustment position,
  and the locking pin being arranged within the longitudinal hole, the locking pin being movable along the length of the longitudinal hole.

By this constructional design, while the invention is explicitly not restricted thereto, it is safeguarded that the transition of the operating element from the first adjustment range into the second adjustment range is locked and first has to be released by press-down of the locking pin in the switch-off position so as to allow for transfer of the operating element into the second adjustment range.

Figure 2:
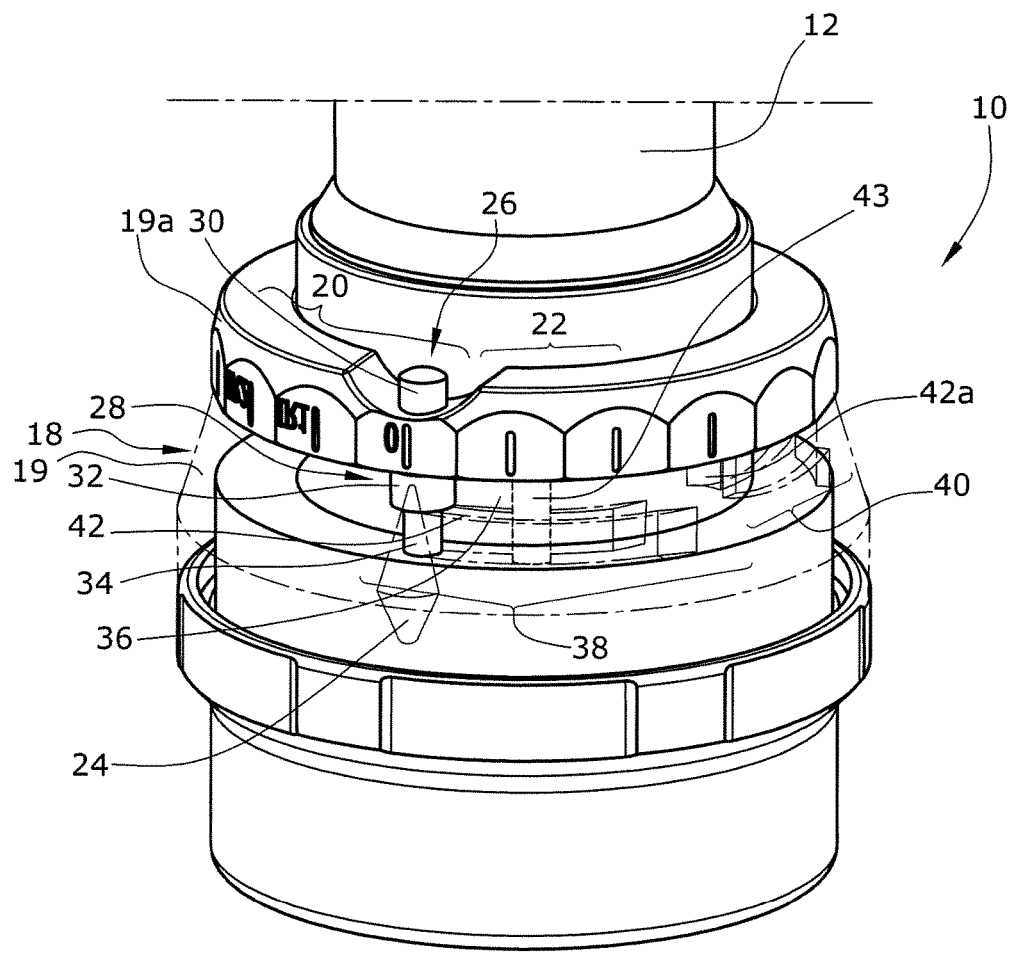
Figure 3:
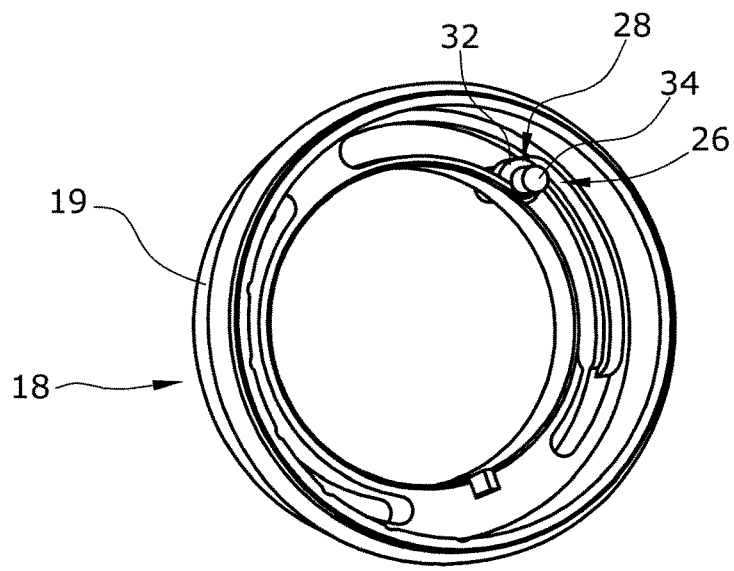
Figure 4:
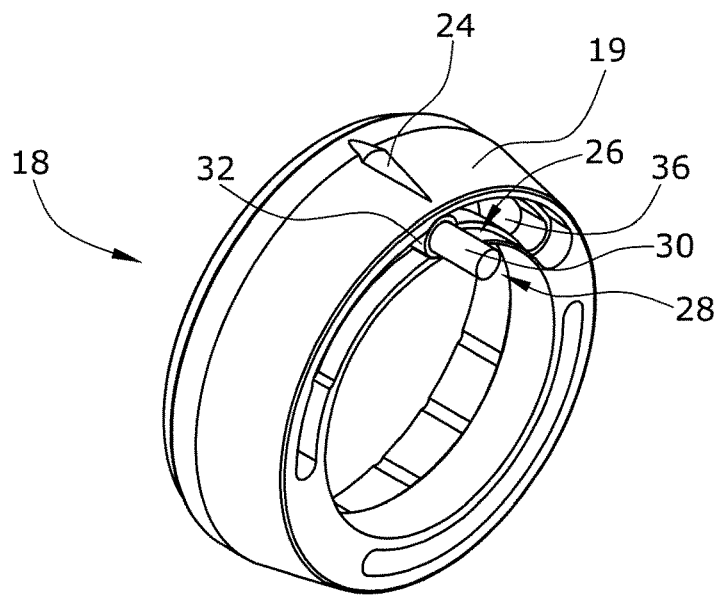
Figure 5:
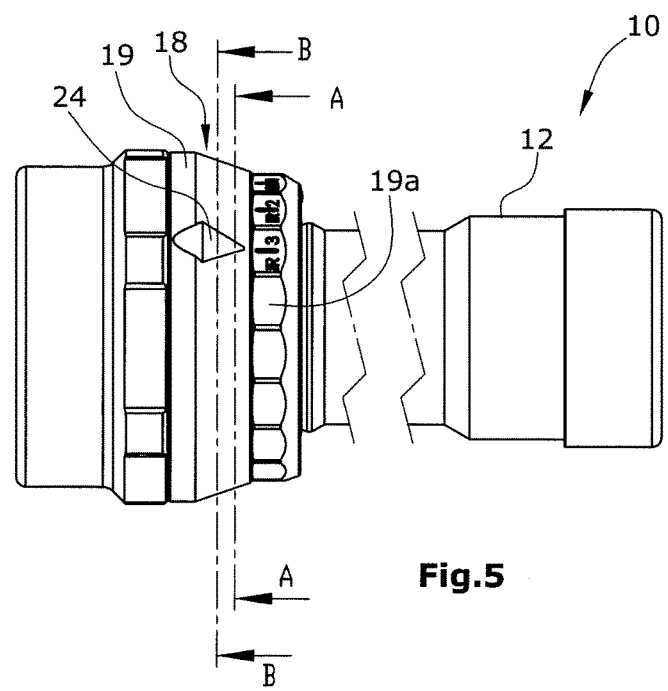
Figures 6, 7:
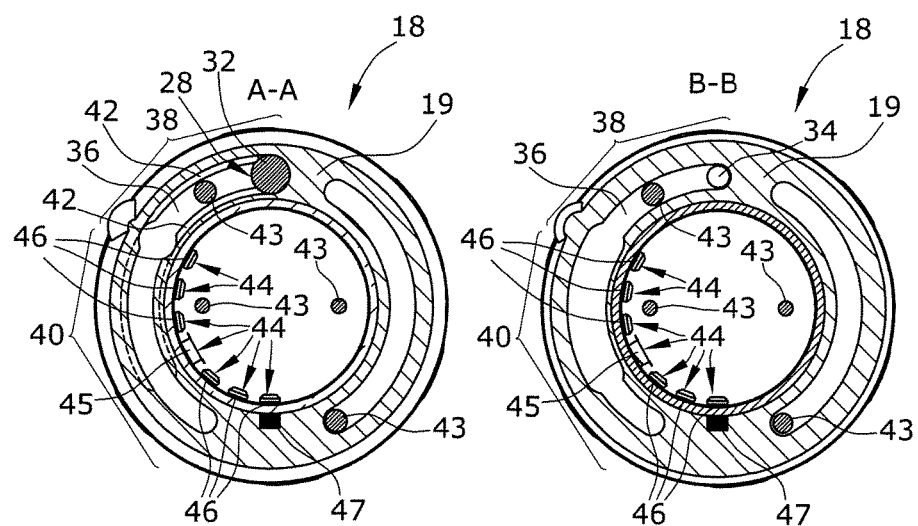
Figures 12, 13:
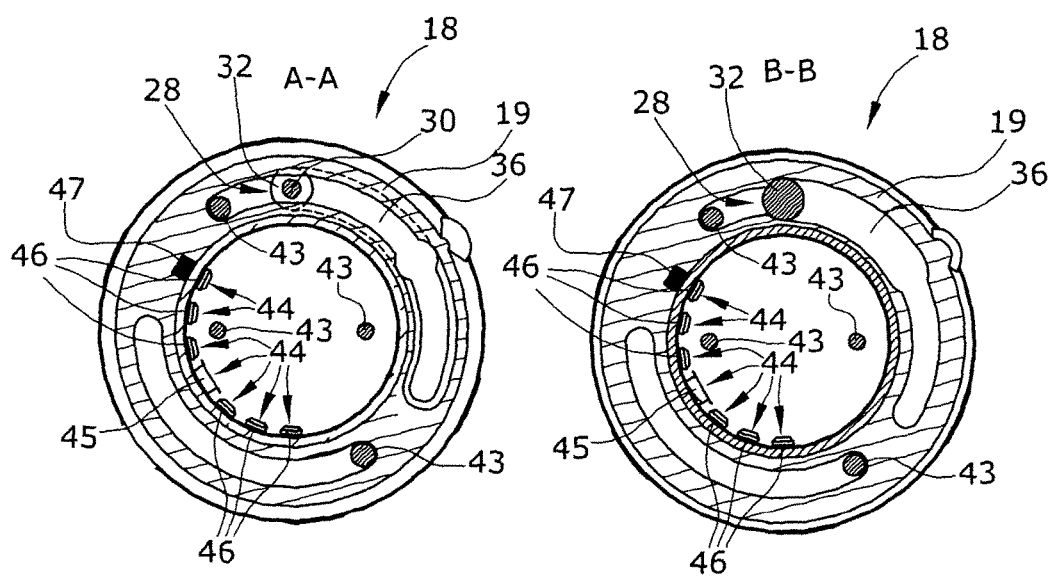
Figure 14:
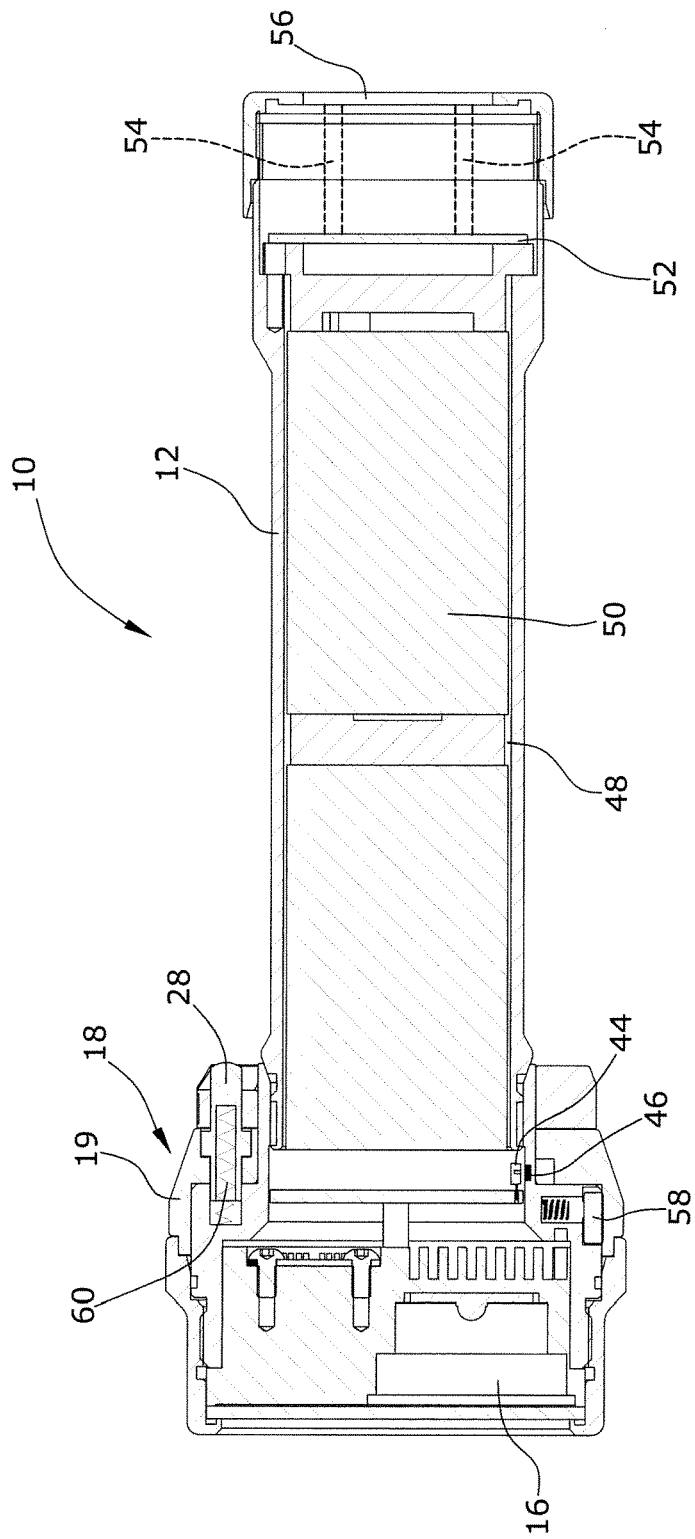

The invention will be described in greater detail hereunder by way of an exemplary embodiment with reference to the drawings. In the individual Figures, the following is shown:

FIG. 1 is a perspective view of an exemplary embodiment of the flashlight according to the invention, FIG. 2 is a further perspective view of the flashlight shown in FIG. 1, FIG. 3 is a perspective view of a locking pin arranged in an adjustment ring, FIG. 4 is a further perspective view of the adjustment ring shown in FIG. 3 and of the locking pin, FIG. 5 is a lateral view of the flashlight shown in FIG. 1, shown in a first adjustment position, FIGS. 6 and 7
are sectional views taken along the lines A-A and B-B in FIG. 5, in the first adjustment position, FIGS. 8 and 9
are sectional views taken along the lines A-A and B-B in FIG. 5, in the switch-off position, FIGS. 10 and 11
are sectional views taken along the lines A-A and B-B in FIG. 5, in the switch-off position and in the depressed state of the locking pin, FIGS. 12 and 13
are sectional views taken along the lines A-A and B-B in FIG. 5, in a further adjustment position and FIG. 14 is a longitudinal sectional view of the flashlight shown in FIG. 1.

In FIG. 1, there is shown an exemplary embodiment of the flashlight 10 according to the invention, comprising a casing 12, two infrared light sources 14 and a visible light source 16. Further depicted in FIG. 1 is an operating element 18 which in the present embodiment is designed as a rotatable adjustment ring 19. By rotating the adjustment ring 19, a desired operating mode of the flashlight 10 can be set. Further, a second ring 19a is provided which is substantially non-rotatable and which comprises a first adjustment range 20 and a second adjustment range 22. In the present embodiment, the first adjustment range 20 comprises three infrared light modes and one switch-off mode while the second adjustment range comprises three visible light modes. An indicator 24 arranged on adjustment ring 19 indicates which mode has been set. By the rotation of adjustment ring 19, the arranged on adjustment ring 19 will be moved along the adjustment ranges 20, 22. Further, in FIG. 1, there is schematically outlined a locking element 26 which in the present embodiment is designed as a locking pin 28.

FIG. 2 shows a further perspective view of the flashlight 10 according to the invention. In this view, it can be seen that the locking pin 28 comprises a pin head 30, a pin collar 32 and a lower pin portion 34. All of the three pin portions (pin head 30, pin collar 32 and lower pin portion 34) are of a cylindrical shape. While, in this embodiment, the pin head 30 and the lower pin portion 34 have the same diameter, the pin collar 32 has a larger diameter than the aforementioned pin portions. In FIG. 2, it can be further seen that the operating element 18 comprises a curved longitudinal hole 36. The curved longitudinal hole 36 in turn comprises a first longitudinal hole portion 38 and a second longitudinal hole portion 40. The locking pin 28 is set into the longitudinal hole 36 and is moveable along the longitudinal direction of the longitudinal hole 36. In the view depicted in FIG. 2, the operating element 18 is in the switch-off mode. By rotation of the operating element 18, another operating mode can be set. The operating element 18 can be easily moved between the modes "IR 3", "IR 2", "IR 1" and the switch-off mode. In the operating modes "IR 3", "IR 2" and "IR 1", the operating element 18, cannot be pressed down because the operating element 18 comprises a support shoulder 42 in the first longitudinal hole portion 38. Only in the switch-off mode "0", the locking pin 28 is in a position in which no support shoulder 42 but, instead, a circular bore exists in the first longitudinal hole portion 38. Upon rotation of adjustment ring 19 from the adjustment position "IR 3" into the switch-off position "0", the pin collar 32 will abut against an abutment face 42a because, in the second longitudinal hole portion, the operating element 18 has a smaller diameter than the pin collar 32. Thereby, an undesired transitional movement from the first adjustment range 20 into the second adjustment range 22 is prevented. In this manner, it is precluded that the user of the flashlight might erroneously activate the visible light mode. Only by pressing the locking pin 28 in the switch-off mode "0", the pin collar 32 will be caused to enter a region in which it can be transferred into the second adjustment range 22. During the transitional movement into the second adjustment range 22, the pin head 30 is guided into the second longitudinal hole portion 40. Pin collar 32 is guided below the second longitudinal hole portion 40.

For additional illustration, FIG. 3 shows a further view of the rotatable adjustment ring 19 including the locking pin 28 arranged within it. In the view of FIG. 3, it is the bottom side of the rotatable adjustment ring 19 that is shown.

Further, FIG. 4 shows an additional view of adjustment ring 19. Here, the top side of adjustment ring 19 is shown. In this view, the support shoulder 42 in the first longitudinal hole portion 38 of adjustment ring 19 can be seen. In this exemplary embodiment, the support shoulder 42 extends (except for the switch-off position) along the entire first longitudinal hole portion. In other words, the support shoulder 42 extends throughout the first longitudinal hole portion 38 while, in the switch-off position, there is provided a bore with a diameter which is larger than the diameter of pin collar 32.

In this manner, the pin collar 32, when in the adjustment positions "IR 3", "IR 2" and "IR 1", is supported by support shoulder 42, thus blocking a press-down of the locking pin 28 in these adjustment positions. When in the switch-off position "0", the locking pin 28 can be pressed down.

FIG. 5 shows a lateral view of the flashlight 10 of the invention wherein the operating element 18 is in the adjustment position "IR 3". Further shown in FIG. 5 are two sectional lines A-A and B-B.

In FIGS. 6 and 7, there are shown sectional views of the flashlight 10 of the invention in the adjustment position "IR 3" along the sectional lines A-A and B-B. In FIG. 6, there can be seen the locking pin 28 in pin collar 32 that is set into the first longitudinal hole portion 38. Further, there can be seen the support shoulder 42 in the first longitudinal hole portion 38. By the support shoulder 42, press-down of the locking pin 28 in the first adjustment range 20 (except for the switch-off position) is prevented. Further shown in FIG. 6 are a plurality of locking pins 43 by which the components of the flashlight 10 above and below the adjustment are connected to each other. Further, there can be seen the magnetic sensors 44 which are fixedly arranged within the flashlight casing 12. In the illustrated exemplary embodiment, the magnetic sensors 44 are a reed switch 45 and six Hall sensors 46 of which respectively three are arranged on the left-hand side of said reed switch 45 and another three are arranged on the right-hand side of reed switch 45. Further, in FIG. 7, a permanent magnet 47 is shown which is set into place within adjustment ring 19 and is moveable along with the latter.

FIGS. 8 and 9 show respective sectional views of the flashlight 10 of the invention in the switch-off position along the sectional lines A-A and B-B. In these views, the locking pin 28 is in a non-depressed state. In this state, pin collar 32 is pressed against the abutment face 42a of operating element 18. Thereby, further rotation of adjustment ring 19 into the second adjustment range 22 is blocked.

FIGS. 10 and 11 show respective sectional views of the flashlight 10 of the invention along the sectional lines A-A and B-B when the adjustment ring 19 is arranged in the switch-off position and the locking pin 28 is in its depressed state. In this position, adjustment ring 19 can be rotated into the second adjustment range 22.

FIGS. 12 and 13 show sectional views of the flashlight 10 of the invention along the sectional lines A-A and B-B when the operating element 18 is arranged in the outermost adjustment position of the second adjustment range 22.

FIG. 14, finally, shows a sectional view of the flashlight 10 of the invention along its longitudinal axis. In this view, the energy source 50 in the casing interior 48 can be seen. The energy source can preferably be a lead accumulator. The energy source 50 can be optimally charged via the charging board 52. Further, it can be provided that the charging board 52 will monitor the energy source temperature. Further, the connection terminals 54 are shown via which the charging board can be powered from an external energy source. For this purpose, it may be required to unscrew a casing lid 56 from the rest of the casing 12 in order to connect an external energy source—via the connection terminals 54—to the charging board 52. FIG. 14 further shows locking cams 58 which are operative to bring the adjustment ring into locking engagement in the individual adjustment positions. Likewise shown in FIG. 14 is the locking pin 28 which is resiliently supported in axial direction with the aid of a return spring 60. FIG. 14 also schematically shows a magnetic sensor 44 and a permanent magnet 47 which are used for detection of the present adjustment position. It is thus rendered possible, in dependence on the adjustment position of adjustment ring 19, to transmit a control signal to the control unit which will perform the desired control of the light sources 14, 16. The control unit, which is not illustrated in the Figures, preferably can be a microcontroller.

LIST OF REFERENCE NUMERALS 10 flashlight
12 casing 14 infrared light source
16 visible light source
18 operating element
19 adjustment ring
19a second ring
20 first adjustment range
22 second adjustment range
24 indicator
26 locking element
28 locking pin
30 pin head
32 pin collar
34 lower pin portion
36 longitudinal hole
38 first longitudinal hole portion
40 second longitudinal hole portion
42 support shoulder
42a abutment face
43 connection pin
44 magnetic sensor
45 reed switch
46 Hall sensor
47 permanent magnet
48 casing interior
50 energy source
52 charging board
54 connection terminal
56 casing lid
58 locking cam
60 return spring

The invention claimed is:

1. A flashlight comprising a casing having a casing interior and a casing outer side;
   an infrared light source arranged in the casing interior for operation in at least one infrared light mode;
   a visible light source arranged in the casing interior for operation in at least one visible light mode;
   an energy source;
   a control unit for driving the infrared light source and the visible light source;
   a manually operable operating element, arranged on the casing outer side, for selecting between the at least one infrared light mode, the at least one visible light mode and a switch-off mode; wherein
   the operating element is movable into different adjustment positions along an adjustment path comprising a first adjustment range and a second adjustment range, wherein, in said first range, the at least one infrared light mode or the switch-off mode is selectable and, in said second range, the at least one visible light mode is selectable; and
   a locking element for locking the operating element upon its movement from said first range to said second range, wherein the locking of the operating element upon its movement from said first range to said second range can be released by actuation of the locking element in a switched-off mode adjustment position, and
   wherein a transition of the operating element from said second range to said first range is performed in an unhindered manner without stopping automatically the operating element from transitioning from said second range to said first range, independent from the actuation of the locking element.

2. The flashlight of claim 1, wherein the operating element is designed as rotatable adjustment ring.

3. The flashlight of claim 2, wherein a current adjustment position of the operating element is detectable by at least one magnetic sensor.

4. The flashlight of claim 1, wherein a current adjustment position of the operating element is detectable by at least one magnetic sensor.

5. The flashlight of claim 4, wherein the at least one magnetic sensor is designed as a Hall sensor.

6. The flashlight of claim 4, wherein the control unit is designed as a microcontroller.

7. The flashlight of claim 1, wherein the control unit is designed to generate a pulse width modulation signal, a blinking signal, an SOS signal or a stroboscope signal.

8. The flashlight of claim 1, wherein the casing comprises at least one heat insulation material.

9. The flashlight of claim 1, wherein the casing comprises at least one sealing element.

10. The flashlight of claim 1, wherein the outer side of the casing comprises an infrared light display device for displaying a current state of the energy source charge level when the infrared light mode has been selected.

11. The flashlight of claim 10, wherein the infrared light display device is activated only in the infrared light mode.

12. The flashlight of claim 1, wherein the outer side of the casing comprises a visible light display device for displaying a current state of the energy source charge level when the visible light mode has been selected.

13. The flashlight of claim 12, wherein the visible light display device is activated only in the visible light mode.

14. The flashlight of claim 1, wherein
   the locking element is designed as a locking pin comprising a cylindrical pin head having a first pin diameter and a cylindrical pin collar having a second pin diameter,
   the second pin diameter being larger than the first pin diameter, and
   the locking pin being resiliently supported along its longitudinal axis,
   the operating element comprises a longitudinal hole including a first longitudinal hole portion within which adjustment positions of the first adjustment range can be selected, and a second longitudinal hole portion within which adjustment positions of the second adjustment range can be selected,
   the first longitudinal hole portion having a first longitudinal hole diameter and the second longitudinal hole portion having a second longitudinal hole diameter,
   first longitudinal hole diameter being larger than the second pin diameter, and the second longitudinal hole diameter is smaller than the second pin diameter and larger than the first pin diameter,
   the operating element comprising, in the first longitudinal hole portion, a support shoulder for supporting the pin collar and for preventing the locking pin from being pressed down in all adjustment positions in the first adjustment range, except for the switched-off mode adjustment position,
   and the locking pin being arranged within the longitudinal hole, the locking pin being movable along the length of the longitudinal hole.

* * * * *